Jan. 5, 1965  AKIYOSHI MASUDA  3,164,507
METHOD OF MAKING CYLINDERS FOR RAISING AND
TRANSPLANTING SEEDLINGS OF FARM CROPS
Filed March 6, 1962

8,164,507
METHOD OF MAKING CYLINDERS FOR RAISING AND TRANSPLANTING SEEDLINGS OF FARM CROPS
Akiyoshi Masuda, Shimoinada, Kawanishi-cho, Obihiro-shi, Hokkaido, Japan, assignor to Nippon Tensai Seito Kabushiki Kaisha, Tokyo, Japan
Filed Mar. 6, 1962, Ser. No. 177,819
Claims priority, application Japan, July 31, 1961, 36/27,305
2 Claims. (Cl. 156—197)

In raising and transplanting the seedlings of farm crops, it has hitherto been a common practice to make various kinds of pots made of paper materials or the like, raise the seedlings in said pots, and then transplant them to the field with or without said paper pots in which the seedlings have been raised. In this case much effort has been necessary to carry out the various operations, such as soil-filling and seed-sowing, in each paper pot and it has been well-known to those engaging in practice that the transplantation of seedlings is mostly impracticable in the case of field crops of a low unit price.

The present inventor, noticing this point, has been successful in inventing the present invention as the result of studies on making paper cylinders for raising and transplanting seedlings or the like.

In accordance with this invention, the production of an assemblage of cylinders for raising and transplanting is effected through the following steps: At first a number of bottomless cylinders of a film of a porous and antiseptic material like paper which has been cut into strips of a convenient width are produced by pasting a vertical edge of the strip on the opposite edge thereof by a water-insoluble paste. Then the bottomless cylinders are flattened. A series of the flattened cylinders is subassembled by pasting one of the flattened cylinders on another by a water-soluble paste in such a manner that one-third along the right edge of the front outer surface of first flattened cylinder is overlapped on one-third along the left edge of the rear outer surface of second flattened cylinder, of which one-third along the right edge of the rear outer surface is overlapped on one-third along the left edge of the front outer surface of third flattened cylinder, and repeating the pasting successively. Then the series is cut into a plurality of units having a predetermined height. At last an assemblage of cylinders is assembled by pasting one of said unit on another by said water-soluble paste in such a manner that one-third along the left edge of the front outer surface of the second flattened cylinder of the first unit is overlapped on one-third along the right edge of the rear outer surface of the first flattened cylinder of the second unit and one-third along the right edge of the front outer surface of the second flattened cylinder of the first unit is overlapped on one-third along the left edge of the rear outer surface of the third flattened cylinder of the second unit, and repeating the second-named pasting successively. An assemblage of cylinders expansible into a honeycombed construction is made as above.

In accordance with this invention further, the seed sowing operation and seedling raising operation can be practiced by handling an assemblage of paper cylinders which is characterised by proper use of water-soluble and water-insoluble pastes. Thus after the completion of raising seedling each cylinder can be easily separated and the purpose of transplanting seedling can be realized safely, rapidly and economically without damaging the root system of it.

These and other features of my invention will appear from the description in connection with the accompanying drawings, in which.

Figure 1:
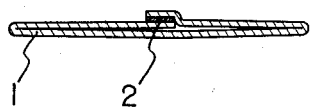
FIG. 1 is a cross section of a single bottomless paper cylinder formed in accordance with this invention, in which opposite edges are overlapped on and pasted with each other by a water-insoluble paste.

The following example illustrates the method of carrying this invention into effect; however, this description will be understood to be illustrative of the invention and not as limiting it to the particulars shown and described. At first a number of bottomless cylinders 1 of a film of a porous and antiseptic material, such as paper, which has been cut into strips of a convenient width are produced continuously by pasting a vertical edge of the strip on the opposite edge thereof by a water-insoluble paste 2, for example, vinyl acetate paste. Then the bottomless cylinders are flattened by pressing them as shown in FIG. 1.

In the second stage, a series of the flattened cylinders is subassembled by pasting one of the flattened cylinders on another by a water-soluble paste, for example, gum arabic, in such a manner that one-third along the right edge of the front outer surface of first flattened cylinder is overlapped on one-third along the left edge of the rear surface of second flattened cylinder, of which one-third along the right edge of the rear outer surface is overlapped on one-third along the left edge of the front outer surface of third flattened cylinder, and repeating the pasting successively. Numeral 3 indicates the water-soluble paste. Then the series is cut into a plurality of units having a predetermined height.

Figure 2:
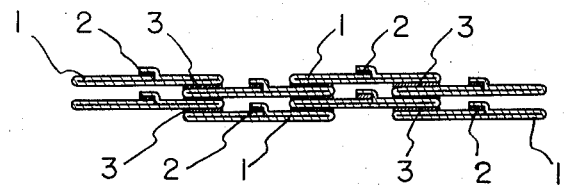
FIG. 2 is a cross section of a part of an assemblage, in which a cylinder is pasted with others by a water-soluble paste.
Figure 3:
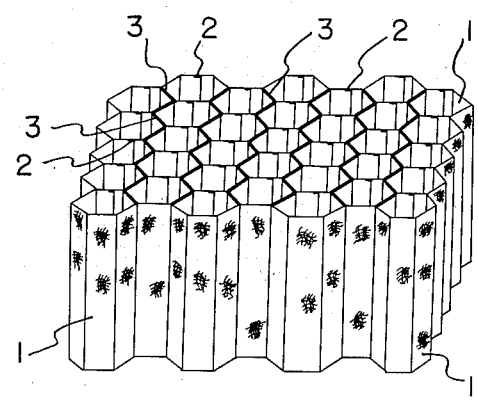
FIG. 3 is a perspective view of the assemblage shown in FIG. 2 but expanded to show the honeycombed construction.

At last an assemblage of cylinders as shown in FIGS. 2 and 3 is assembled by pasting one of said unit on another by the water-soluble paste in such a manner that one-third along the left edge of the front outer surface of the second flattened cylinder of the first unit is overlapped on one-third along the right edge of the rear outer surface of the first flattened cylinder of the second unit and one-third along the right edge of the front outer surface of the second flattened cylinder of the first unit is overlapped on one-third along the left edge of the rear outer surface of the third flattened cylinder of the second unit, and repeating the second-named pasting successively. When expanded, this assemblage of cylinders shows a honeycombed construction.

By virtue of the flattenable construction, even if an assemblage of cylinders comprises a number of units overlapped and pasted one upon another, it may be enough compact so as to facilitate to handle it, and particularly to transport and store it. It is also very easy to position vertically and expand into the honeycombed state a great number of cylinders for farm use.

By virtue of the pasted construction of a number of cylinders using a water-soluble paste 3, the whole assemblage becomes very rigid even when the raw material is poorly rigid and flexible. Thus it becomes very convenient to pour cultivating soil into each cylinder. Furthermore, since the cylinders are closely pasted one after another by a water-soluble paste 3, it is possible to fill up the cylinders with soil without it pouring out of the cylinders.

By virtue of the regularity of the honeycombed construction, it becomes possible to mechanize the seed-sowing operation and soil-filling operation easily.

Figure 4:
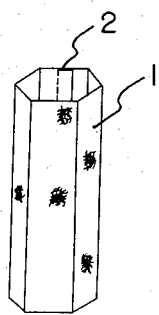
FIG. 4 is a perspective view of a single cylinder isolated again.

After the cylinders have been filled with soil and seeds have been sown, the cylinders are set on a cold bed or a hot bed and sprinkled with water, whereby the water-soluble paste 3 between cylinders is gradually dissolved and washed away and its adhesive capacity decreases extremely, while the adhesive capacity of the water-insoluble paste 2 remains unchanged semipermanently. When, therefore, the seedlings are transplanted to the field, individual cylinders can be separated from others or isolated easily and completely, as shown in FIG. 4. Thus each seedling can be transplanted in the ground in such a manner that each cylinder in which the seedling has been raised is buried in the ground individually. In this case, the operation of transplantation is just as simple as in the case where seedlings have been raised in individual cylinders which have not been assembled and are transplanted to the field. By virtue of such an operation of transplanting seedlings to the ground together with a cylinder in which the seedling has been raised and which has been isolated from others, the root system of the seedlings is protected from any damage completely and will continue normal growth without the so-called "striking root or taking root" phenomenon, so that it is possible to expect an increased yield, the primary purpose of transplantation, and, in addition, to shorten the raising period in the farm.

If the cylinders in accordance with this invention are used in raising and transplanting seedlings of sugar beet and they are transplanted by burying the cylinders in the ground before the main roots of the seedlings reach bottoms of the cylinders, respectively, it is possible to transplant the seedlings as they are without any fear of imparting any injury to the root system and forming any prongy root which occurs inevitably hitherto when root vegetables are transplanted as described in detail in the specifications of Japanese patents which have been published in the Japanese Patent Official Gazettes under the Publication Nos. 6205 of 1959 and 309 of 1961, respectively.

In accordance with this invention, it is possible to perform such operations as sowing seeds, raising seedlings, and transplanting them with cylinders, respectively, very easily by virtue of the use of the assemblage of cylinders in which water-soluble paste and water-insoluble paste are used properly. Therefore, not only high-grade vegetables but also farm crops of low cost may be raised and transplanted in the range of an economical profit so as to bring remarkable effects to agriculture.

*Example*

A porous and antiseptic paper was cut into strips 6.5 cm. wide. A longitudinal edge of the strip was overlapped on the opposite edge and pasted therewith by a vinyl acetate emulsion to form a cylinder having a circumference of 6 cm., the margin for overlapping being 0.5 cm. wide. The bottomless cylinders so formed were pressed and flattened.

One of the flattened cylinders was pasted and overlapped on another. The pasting material was gum arabic. The lap was one-third of an outer surface of the flattened cylinder or 1 cm. wide, one-third along the right edge of the front outer surface of the first cylinder being overlapped on one-third along the left edge of the rear surface of the second cylinder. Then one-third along the right edge of the rear outer surface of the second cylinder was pasted and overlapped on one-third along the left edge of the front outer surface of still another flattened cylinder. Repeating in such a manner as above, twenty flattened cylinders were subassembled and made of uniform height of 13.5 cm. cutting off any longitudinal protrusions.

Then one of seventy-five units thus subassembled was pasted and overlapped on another. The pasting material was gum arabic. One-third along the left edge of the front outer surface of the second flattened cylinder of the first unit is overlapped on one-third along the right edge of the rear outer surface of the first flattened cylinder of the second unit and one-third along the right edge of the front outer surface of the second flattened cylinder of the first unit is overlapped on one-third along the left edge of the rear outer surface of the third flattened cylinder of the second unit. Repeating in such a manner as above, the seventy-five units were pasted one on another. Thus an assemblage comprising 1500 flattened cylinders was formed with the seventy-five units arranged alternately or zigzag. The assemblage was easily expansible and reflattenable. When expanded, it shows a fine honeycombed construction.

The assemblage was expanded and filled with cultivating soil. Seeds of sugar beet were sown in the soil in the expanded cylinders of the assemblage, respectively, and raised for about thirty days during which water was sprinkled over the assemblage as frequently as in the customary cultivating method. Gum arabic by which the cylinders have been pasted one after another was dissolved away gradually by water so that the cylinders including cultivating soil and seedlings, respectively, were isolated as they were. Then each cylinder was buried in the ground of the farm individually. Afterwards it was found that the sugar beet had ideal root. Although the entire labour needed for raising the seedlings and transplanting them with the cylinders in accordance with this invention was approximately the same as those needed for practice of the sugar beet cultivating method as commonly known, the yield of sugar beet roots was increased about thirty percent compared with the conventional cultivating method.

What I claim is:

1. A method of producing an assemblage of cylinders for raising and transplanting seedlings of farm crops, comprising steps of producing a number of bottomless cylinders of a film of a porous and antiseptic material like paper which has been cut into strips of a convenient width, by pasting a vertical edge of said strip on the opposite edge thereof by a water-insoluble paste; flattening said bottomless cylinders; subassembling series of said cylinders by pasting one of said flattened cylinders on another by a water-soluble paste in such a manner that one-third along the right edge of the front outer surface of a first flattened cylinder is overlapped on one-third along the left edge of the rear outer surface of a second flattened cylinder, of which one-third along the right edge of said rear outer surface is overlapped on one-third along the left edge of the front outer surface of a third flattened cylinder, and repeating said pasting successively; cutting said series into a plurality of units having a predetermined height; and assembling an assemblage of cylinders by pasting one of said units on another by said water-soluble paste in such a manner that one-third along the left edge of the front outer surface of the second flattened cylinder of the first unit is overlapped on one-third along the right edge of the rear outer surface of the first flattened cylinder of the second unit and one-third along the right edge of the front outer surface of said second flattened cylinder of said first unit is overlapped on one-third along the left edge of the rear outer surface of the third flattened cylinder of said second unit, and repeating the second-named pasting successively, whereby an assemblage of cylinders expansible into a honeycombed construction is made.

2. A method of producing an assemblage of cylinders for raising and transplanting seedlings of farm crops, comprising steps of producing a number of bottomless cylinders of a film of a porous and antiseptic material like paper which has been cut into strips of a convenient width, by pasting a vertical edge of said strip on the opposite edge thereof by a water-insoluble paste; flattening said bottomless cylinders; subassembling series of said cylinders by pasting one of said flattened cylinders on another by a water-soluble paste in such a manner that one-third along the right edge of the front outer surface of a first flattened cylinder is overlapped on one-third along the left edge of the rear outer surface of a second flattened cylinder, of which one-third along the right edge of the front outer surface is overlapped on one-third along the left edge of the rear outer surface of a third flattened cylinder, and repeating said pasting successively; cutting said series into a plurality of units having a predetermined height; and assembling an assemblage of cylinders by pasting one of said units on another by said water-soluble paste in such a manner that one-third along the left edge of the front outer surface of the second flattened cylinder of the first unit is overlapped on one-third along the right edge of the rear outer surface of the first flattened cylinder of the second unit and one-third along the left edge of the front outer surface of the third flattened cylinder of said first unit is overlapped on one-third along the right edge of the rear outer surface of the second flattened cylinder of said second unit, and repeating the second-named pasting successively, whereby an assemblage of cylinders expansible into a honeycombed construction is made.

References Cited by the Examiner

UNITED STATES PATENTS

| | | | |
|---|---|---|---|
| 1,993,620 | 3/35 | Otwell | 47—37.2 |
| 2,022,548 | 11/35 | Otwell | 47—37.2 |
| 2,423,724 | 7/47 | Paxton | 47—37 |
| 2,477,852 | 8/49 | Bacon | 154—45.9 |
| 2,887,425 | 5/59 | Holland | 156—197 |
| 2,957,274 | 10/60 | Colvin | 47—37.2 |
| 2,983,640 | 5/61 | Knoll et al. | 156—197 |
| 3,032,927 | 5/62 | Kobs | 47—37 |

T. GRAHAM CRAVER, *Primary Examiner.*